(12) United States Patent
Aimutis et al.

(10) Patent No.: US 12,121,047 B2
(45) Date of Patent: Oct. 22, 2024

(54) DYNAMICALLY DELIVERING FAT AND FLAVOR POTENTIATORS TO FOODS AND METHODS OF USE THEREOF

(71) Applicant: Botany AI, Inc., Austin, TX (US)

(72) Inventors: William Aimutis, Austin, TX (US); Charles Dykes, Austin, TX (US); Christiaan Thoen, Austin, TX (US)

(73) Assignee: Botany AI, Inc., Austin, TX (US)

( * ) Notice: Subject to any disclaimer, the term of this patent is extended or adjusted under 35 U.S.C. 154(b) by 0 days.

(21) Appl. No.: 18/335,809

(22) Filed: Jun. 15, 2023

(65) Prior Publication Data

US 2023/0404123 A1    Dec. 21, 2023

Related U.S. Application Data

(63) Continuation-in-part of application No. 17/840,223, filed on Jun. 14, 2022, now abandoned.

(51) Int. Cl.
| | | |
|---|---|---|
| *A23L 27/00* | (2016.01) | |
| *A23L 27/21* | (2016.01) | |
| *A23L 29/262* | (2016.01) | |
| *C08J 3/075* | (2006.01) | |
| *C08L 1/28* | (2006.01) | |

(52) U.S. Cl.
CPC .............. *A23L 27/72* (2016.08); *A23L 27/21* (2016.08); *A23L 27/88* (2016.08); *A23L 29/262* (2016.08); *C08J 3/075* (2013.01); *C08L 1/28* (2013.01); *C08J 2301/28* (2013.01); *C08J 2489/00* (2013.01)

(58) Field of Classification Search
CPC ..... A23V 2200/224; A23L 2/66; A23L 27/72; A23L 33/17; A23L 27/10; A23L 27/88; A23L 29/262; C08L 1/28; A61K 8/964; A61K 8/042; C08J 3/02; C08J 3/075
See application file for complete search history.

(56) References Cited

U.S. PATENT DOCUMENTS

| | | |
|---|---|---|
| 2012/0321751 A1 | 12/2012 | Pedersen et al. |
| 2015/0272187 A1 | 10/2015 | Lee et al. |

(Continued)

FOREIGN PATENT DOCUMENTS

| | | |
|---|---|---|
| CN | 114191381 A | 3/2022 |
| EP | 0252374 A1 | 1/1988 |

(Continued)

OTHER PUBLICATIONS

Zhang et al., "Novel Umami Ingredients: Umami Peptides and Their Taste", Journal of Food Science, vol. 82, Nr.1, 2007.

(Continued)

*Primary Examiner* — Hong T Yoo
(74) *Attorney, Agent, or Firm* — GREENBERG TRAURIG, LLP

(57) ABSTRACT

A method and product comprising mixing at least one oil to a converted methylcellulose polymer to result in a methylcellulose polymer-oil mixture, mixing at least one hydrocolloid to the methylcellulose polymer-oil mixture and heating the methylcellulose polymer-oil mixture to result in a microgel structure; and entrapping at least one flavor potentiator within the microgel structure to result in a peptide-infused microgel structure.

18 Claims, 3 Drawing Sheets

(56) References Cited

U.S. PATENT DOCUMENTS

2020/0268622 A1\* 8/2020 Abbaspourrad ....... A61K 8/922
2022/0279827 A1 9/2022 Sillick et al.

FOREIGN PATENT DOCUMENTS

RU 2224442 C1 2/2004
WO 2003/048211 A1 6/2003

OTHER PUBLICATIONS

Flavor Potentiators, Food Additives, Jul. 5, 2018 <<https://foodadditive.blogspot.com/2018/07/flavor-potentiators.html>>.
Li et al., "Current progress in kokumi-active peptides, evaluation and preparation methods: a review", Critical Reviews in Food Science and Nutrition, vol. 62, Issue 5, 2022.
International Search Report and Written Opinion from International Application No. PCT/US2023/068450 dated Jan. 30, 2024.

\* cited by examiner

DYNAMICALLY DELIVERING FAT AND FLAVOR POTENTIATORS TO FOODS AND METHODS OF USE THEREOF

FIELD OF TECHNOLOGY

The present disclosure generally relates to a process configured for dynamically delivering fat and flavor potentiators to foods and methods of use thereof.

BACKGROUND OF TECHNOLOGY

Typically, individuals taste umami through taste receptors that respond to glutamates and nucleotides, which are widely present in meat broths and fermented products. Flavor enhancers impact the taste and flavor of food by imparting an actual flavor that complements a characterizing flavor and give no flavor of their own at typical usage levels. These flavor enhancers are generally delivered through traditional digestion.

SUMMARY OF DESCRIBED SUBJECT MATTER

In some embodiments, the present disclosure provides an exemplary technically improved method that includes at least the following steps of mixing at least one oil to a converted methylcellulose polymer to result in a methylcellulose polymer-oil mixture, mixing at least one hydrocolloid to the methylcellulose polymer-oil mixture and heating the methylcellulose polymer-oil mixture to result in a microgel structure, where the heating of the microgel structure to a sufficient temperature to result in a liquid phase, where the microgel structure includes an oleogel structure and at least one peptide selected from a group consisting of umami, kokumi, and another sensory peptide; and entrapping at least one flavor potentiator within the microgel structure to result in a peptide-infused microgel structure, where the peptide-infused microgel structure includes the following property: when exposed to sufficient heating, the peptide-infused microgel structure releases the entrapped flavor potentiator in a controlled release.

In some embodiments, the present disclosure provides an exemplary technically improved process that includes at least the following steps of obtaining a methylcellulose polymer, where the methylcellulose polymer is a derivative of cellulose with at least one hydroxyl group associated with at least one methylcellulose polymer; heating and mixing to convert at least one hydroxyl group associated with the methylcellulose polymer into a plurality of methyl ether groups; mixing at least one oil to the converted methylcellulose polymer to result in a methylcellulose polymer-oil mixture, where at least one oil has a melting point that at least meets a predetermined threshold of temperature; mixing at least one hydrocolloid to the methylcellulose polymer-oil mixture and heating the methylcellulose polymer-oil mixture to result in a microgel structure, where the heating of the microgel structure to a sufficient temperature to result in a liquid phase, where the microgel structure includes the following properties: an oleogel structure and at least one peptide selected from a group consisting of umami, kokumi, and another sensory peptide; and entrapping at least one flavor potentiator within the microgel structure to result in a peptide-infused microgel structure, where the peptide-infused microgel structure includes the following property: when exposed to sufficient heating, the peptide-infused microgel structure releases the entrapped flavor potentiator in a controlled release.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
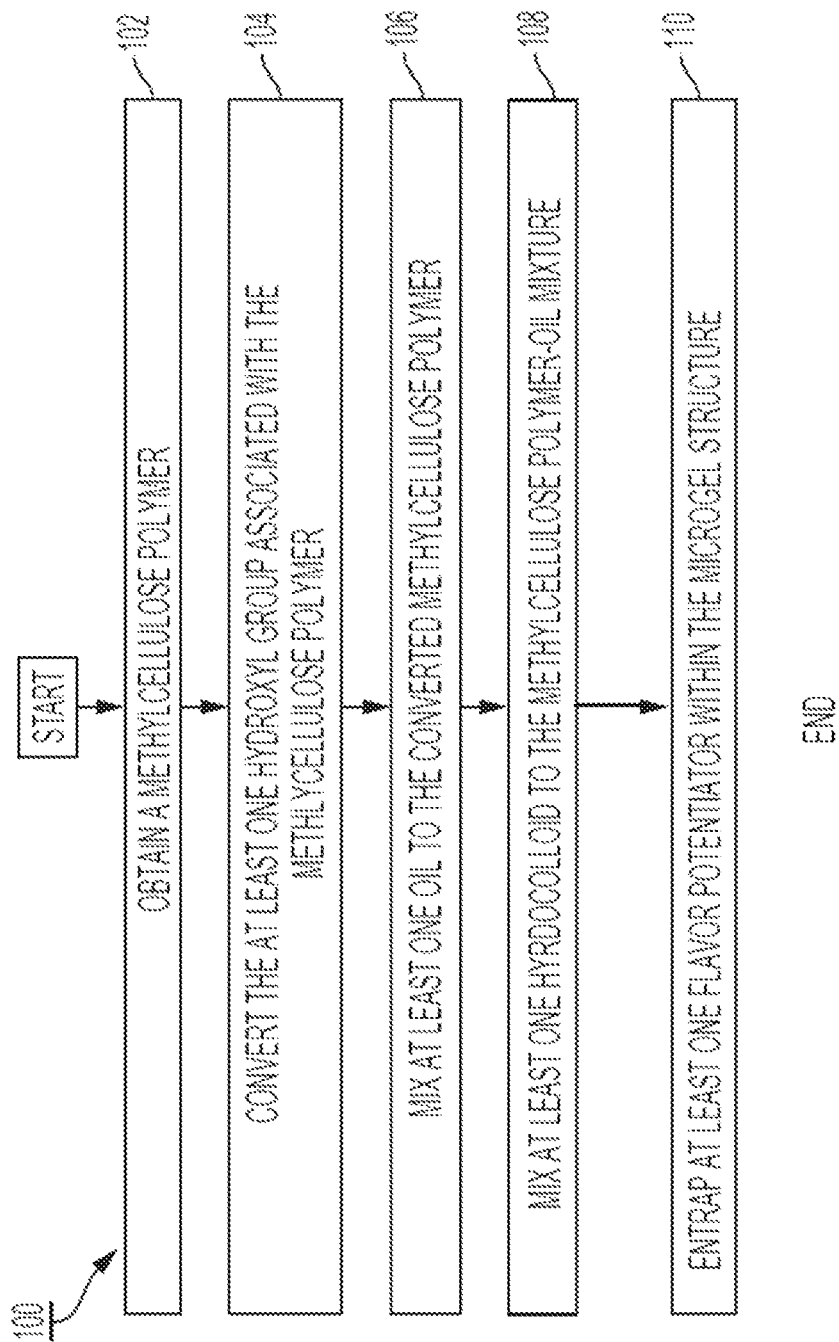
FIG. 1 is a flowchart illustrating operational steps for entrapping at least one flavor potentiator within a microgel structure to result in a peptide-infused microgel structure, in accordance with at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "of" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

Mixing may refer to a process of combining two or more substances, such that each substance maintains its respective chemical identity. Mixing may be classified based on the dispersion uniformity of the substances and form a substantially uniform homogenous mixture. A mixture may refer to a product of mechanically blending or mixing chemical substances such as elements and compounds, without chemical bonding or other chemical change, so that each ingredient substance retains its own chemical properties and makeup. Despite the fact that there are no chemical changes to its constituents, the physical properties of a mixture, such as melting point, may differ from those of the components. Some mixtures can be separated into their components by using physical (mechanical or thermal) means.

An oil may refer to any substance that is maintains a liquid state at room temperature and is insoluble in water. It may be fixed or nonvolatile as a product of animal and plant substances divided between at least two categories including liquid oils and plastic fats. Suitable oils include, but are not limited to, plant-based oils. In one embodiment, a melting point associated with the plant-based oil is a range from 66.2 degrees Fahrenheit to 150.8 degrees Fahrenheit. The oil may make up 51%-90% of total weight composition of an oleogel structure. A suitable range of the oil by total weight composition is 55%-65% of the oleogel structure. The oil may make up to 5%-49% of total weight composition of a microgel structure.

A gelator is any substance capable of forming a gel, which may refer to a plurality of cellulose derivates. For example, ethylcellulose, rice bran wax, sunflower wax, oryzanol, sitosterol, beeswax, candelilla wax, shellac wax, monoglyceride, propolis wax, hydroxypropyl methylcellulose, and methylcellulose are gelators. Suitable gelators include, but or not limited to, methylcellulose. Methylcellulose may refer to a chemical compound derived from cellulose. Methylcellulose may be used as an additive to food compositions and as a thickener, freeze and/or thaw stability, lubricity, moisture retention and release, film formation, texture, consistency, shape retention, and emulsification. For example, methylcellulose has been used for food applications since it was discovered that the thermal gel properties similar to a heat-catalyzed gel. The gelator may make up to 0.1% to 1% of total weight composition of the oleogel structure. The gelator may make up 0.05% to 0.5% of total weight composition of the microgel structure.

Conversion may refer a chemical manufacturing process in which chemical transformation takes place, that is, the product differs chemically from the starting materials. Some chemical manufacturing processes consist of a sequence of steps, each of which involves making some sort of change in either chemical makeup, concentration, phase state, energy level, or a combination of these, in the materials passing through the particular step. If the changes are of a strictly physical nature (i.e., mixing, distillation, drying, filtration, adsorption, condensation), the step is referred to as a unit operation. If the changes are of a chemical nature, where conversion from one chemical species to another takes place (i.e., combustion, polymerization, chlorination, fermentation, reduction, hydrolysis), the step is called a process unit. In some embodiments, conversion may refer to a number of moles of a particular reactant reacted to the total number of moles of the particular reactant fed into a system. The composition of a reacting systems is described in terms of molar concentration.

Hydrocolloid may refer to at least partially water-soluble, natural or synthetic polymers that form gels or viscous solutions or suspensions in aqueous systems. These are normally substances that belong to the substance classes of proteins or polysaccharides, whereby numerous hydrocolloids come from nature, especially from land plants, algae, animals, and bacteria. Hydrocolloids are often used as thickening agents in cosmetics and products in the food industry. Hydrocolloids may refer to a plurality of viscosity modifiers. For example, xanthan gum or guar gum are viscosity modifiers found within the oleogel structure and microgel structure. In some embodiments, the hydrocolloids are in the range of 0.2% to 1% of the total weight composition of the oleogel structure. In some embodiments, the hydrocolloids are in the range of 0.1% to 1% of the total weight composition of the microgel structure.

Heating is the transfer of energy that results from the difference in temperature between a system and its surroundings. At a molecular level, heat is the transfer of energy that makes use of or stimulates disorderly molecular motion in the surroundings. For instance, when a hydrocarbon fuel burns, the energy released in the reaction stimulates the surrounding atoms and molecules into more vigorous random motion, and the escape of energy is referred to as heat. Heat is not stored, rather heat is energy in transit. The quantity of energy transferred as heat as a result of a chemical reaction is identified with the change in the internal energy of the system if the transfer takes place without change in the system's volume, and with the change in enthalpy of the system if the transfer takes place at constant pressure. The energy or enthalpy change accompanying a chemical reaction that is inaccessible to measurement may be determined by using Hess's law, which states that the enthalpy change accompanying a chemical reaction can be regard as the sum of the enthalpy changes of the reactions into which the overall reaction may be divided.

In some embodiments, a microgel is a gel-like material composed of nanoscopic or microscopic colloidal particles or polymer chains dispersed within a liquid aqueous phase. In some embodiments, microgels are characterized by their small particle size and soft, deformable nature. In some embodiments, microgels are functional polymers with diverse applications synthesized by free radical polymerization using an initiator, monomers, and cross-linker as reactants. While monomers and cross-linkers may be incorporated into the microgel during the synthesis, an initiator may be left in the reactor due to its slow decomposition rate. In one example, the microgel is a formation of a polymeric structure resembling an amorphous blob composed predominantly of water.

In some embodiments, a microgel is formed through a process known as gelation or crosslinking. In this process, monomers or polymer chains may be dispersed in a liquid medium, such as water, and undergo a crosslinking reaction. In some embodiments, the microgel particles are crosslinked by interlinking polymer chains formed by the polymerization of ethyleneglycolacrylate (PEGA) and/or acrylamide monomers. In some embodiments, crosslinking agents, which can be chemical compounds or physical stimuli like temperature or pH, may be used to create connections between the polymer chains, resulting in the formation of a three-dimensional network. In some embodiments, this network entraps the liquid within, forming a gel-like structure. In some embodiments, the result is a hydrogel composed of microgel particles connected together by interlinking polymer chains of varying length.

In some embodiments, an example of a microgel is a hydrogel used in biomedical applications. As discussed above, in some embodiments, hydrogels are a type of microgel that consists of a network of hydrophilic polymer chains dispersed in water. Hydrogels are widely used in wound healing, drug delivery systems, and tissue engineering due to their high water content, biocompatibility, and ability to retain large amounts of water. In some embodiments microgels may be used for the preparation of photonic hydrogels, especially photonic hydrogels capable of manipulating photons in the visible and near-infrared spectrum.

In some embodiments, suitable microgel structures include, but are not limited to, a range of 5% to 49% of a plant-based oil, a range of 05% to 0.5% of a gelator, a range of 0.1% to 1% of a at least one viscosity modifier, 250 parts per million (hereinafter "ppm") to 1500 ppm of at least one flavor potentiator, and a range of 51% to 95% of deionized water. In one embodiment, suitable microgel structures include, but are not limited to, a range of 10% to 30% of the plant-based oil, 0.075% to 0.125% of the gelator, 0.4% to 0.8% of the viscosity modifier, 500 ppm to 1000 ppm of a flavor potentiator, and 60% to 90% of deionized water.

A structure is an arrangement of and relations between the parts or elements of something complex. In one embodiment, a chemical structure refers to a determination and specification of a molecular geometry and, when feasible and necessary, the electronic structure of the target molecule or other solid. In some embodiments, the chemical structure refers to a graphical arrangement of chemical bonds between atoms in a molecule (in an ion or radical with multiple atoms), specifically the atoms are chemically bonded to other atoms with the geometric shape of the molecule needed to uniquely identify the type of molecule.

Temperature is a degree or intensity of heat present in a substance or object, especially as expressed according to a comparative scale and shown by a thermometer or perceived by touch. In one embodiment, temperature is a quantitative measure that expresses hot and cold, and the manifestation of thermal energy, present in all matter, which is the source of the occurrence of heat, a flow of energy.

Liquid phase may refer to at least one of the three fundamental structural phases of matter in which the thermal mobility of molecules or atoms is comparable with the cohesiveness, having them connected but fluid in a mass. Liquid may refer to a substance that flows freely but is of constant volume, having a consistency like that of water or oil.

An oleogel, in some embodiments, is a semisolid material that consists of a network or matrix of a gelator dispersed within a liquid oil phase. In some embodiments, an oleogel exhibits gel-like properties such as, for example, increased viscosity and/or solid-like behavior, while still maintaining the characteristics of an oil. In some embodiments, an oleogel is formed by the process of gelation, which involves incorporating a gelator into a liquid oil to create a three-dimensional network or structure. The gelator molecules interact with each other and with the oil molecules, forming a stable network that immobilizes the oil within the gel matrix. In some embodiments, this gelation process can be achieved through various mechanisms including, but not limited to, cooling, solvent evaporation, chemical reactions, or the addition of specific additives.

In some embodiments, an olegoel may refer to a gel having a continuous oil phase having the methylcellulose uniformly dispersed in the gel phase and functioning as the gelling agent. In some embodiments, the oleogel is suitably clear and translucent or even transparent materials having the physical properties of a true gel. In some embodiments, suitable oleogels include, but or not limited to, one or more oils or fats, the methylcellulose, the surfactant, and any combination thereof. In one embodiment, the oleogel structure is an organic liquid entrapped within a thermo-reversible, three-dimensional gel network. In some embodiments, the oleogel is a formation of a polymeric structure resembling an amorphous blob composed predominantly of oil.

In some embodiments, oleogels may be used as fat substitutes in food products to reduce the amount of solid fats while maintaining desirable texture and mouthfeel. For instance, in some embodiments, oleogels may be created using edible gelators and oils to mimic the properties of solid fats like butter or margarine. Oleogels are versatile compounds that, in some embodiments, may be used in a wide range of applications including, for example, cosmetics, pharmaceuticals, personal care products and lubricants.

In some embodiments, suitable oleogel structures include, but are not limited to, a range of 51% to 90% of a plant-based oil, a range of 0.1% to 1% of a gelator, a range of 0.2% to 1% of a at least one viscosity modifier, a range of 250 ppm to 1500 ppm of at least one flavor potentiator, and a range of 10% to 49% of deionized water. In one embodiment, suitable oleogel structures include, but are not limited to, a range of 55% to 65% of the plant-based oil, a range of 0.4% to 0.6% of the gelator, a range of 0.4% to 0.8% of the viscosity modifier, a range of 500 ppm to 1000 ppm of at least one flavor potentiator, and a range of 25% to 35% of deionized water.

A microgel is different from an oleogel in several ways. For example, microgels are water-based and composed of polymers or particles dispersed in a liquid aqueous phase, whereas oleogels are oil-based and consist of a gelator dispersed in a liquid oil phase. Additionally, microgels are formed in water or aqueous solutions, while oleogels are formed in non-aqueous systems or oil-based liquids. Further, microgels typically exhibit a soft, deformable nature due to their water content, and they can swell or shrink in response to environmental stimuli. Oleogels, on the other hand, have a more solid-like behavior and are characterized by increased viscosity and immobilization of the oil phase.

Peptides are a short chain of amino acids connected to one another in a sequence by bonds. In some embodiments, peptides are compound consisting of two or more amino acids linked in a chain, the carboxyl group of each acid being joined to the amino group of the next by a bond of the type —OC—NH—. Peptides are distinguished from proteins by their shorter length, although the cut-off number of amino acids can be arbitrary. Suitable peptides include, but are not limited to, umami, kokumi, and another sensory peptide. In some embodiments, the peptide is in the range of 250 ppm to 1500 ppm of the total weight composition of the oleogel structure and the microgel structure. In one embodiment, the peptide is in the range of 500 ppm to 1000 ppm of the total weight composition of the oleogel structure and the microgel structure.

Umami is considered one of the five basic tastes, alongside sweet, sour, salty, and bitter. Umami has been described as savory with a characteristic of broths and cooked meats. Umami is tasted through taste receptors in the human mouth that typically respond to glutamates and nucleotides, which are widely present in meat broths and fermented products. Umami has a mild but lasting aftertaste associated with salivation and a sensation of furriness on the tongue, simulating the throat, the roof, and the back of the mouth. By itself, umami is not palatable, but it makes a great variety of foods pleasant, especially in the presence of a matching aroma.

In some embodiments, an umami peptide is a type of peptide that possesses the taste sensation known as umami. In some embodiments, umami peptides can be found naturally in various foods or can be generated through specific processes like protein hydrolysis or fermentation. In some embodiments, umami peptides play a crucial role in enhancing the umami taste and adding savory flavors to a wide range of culinary preparations. In some embodiments, the umami peptide may be glutathione. Glutathione is a tripeptide composed of three amino acids: glutamate, cysteine, and glycine and is naturally present in various foods such as fruits, vegetables, and meats, and contributes to the umami taste.

In some embodiments, umami peptides may be hydrolyzed proteins. In some embodiments, when proteins are enzymatically broken down into smaller peptide fragments, the proteins release umami taste compounds, including umami peptides. Some examples of hydrolyzed proteins include, but are not limited to, hydrolyzed soy protein, hydrolyzed yeast extract, and hydrolyzed fish protein, which enhance the savory taste in food products.

In some embodiments, umami peptides may be formed from a fermented protein. In some embodiments, fermentation processes, such as those used in soy sauce, miso, and fermented fish sauces like fish sauce or shrimp paste, generate umami peptides. The fermentation of proteins by specific microorganisms produces umami peptides that contribute to the umami taste in these food products.

In some embodiments, umami peptides may be a seaweed extracts. In some embodiments, certain types of seaweed, such as kombu (kelp), contain naturally occurring umami peptides. These peptides, along with other umami compounds like glutamate, contribute to the distinct savory taste associated with seaweed-based ingredients.

Kokumi is a taste sensation that occurs naturally in fermented foods like alcohol, soy sauce, fish sauces and shrimp paste. The items that cause this taste sensation have been isolated at the protein level and concentrated into a powder compound that can be added to fresh and packaged food to increase the feel of flavors in the mouth. Kokumi boosts the mouth-coating sensation from fat-containing food materials such as a dairy emulsion, increase the roundness of a flavor, and amplify sweetness in reduced-sugar products.

In some embodiments, a kokumi peptide is a type of peptide that contributes to the taste sensation known as kokumi. Kokumi is a Japanese term that describes a unique taste sensation characterized by richness, mouthfulness, and complexity. Unlike the basic tastes (sweet, sour, salty, bitter, and umami), kokumi is considered a "mouth-feel" or "mouthfulness" sensation that enhances the perception of other tastes and provides a lingering, long-lasting flavor. In some embodiments, kokumi peptides work synergistically with other taste components to create a more satisfying and enjoyable taste experience.

In some embodiments, kokumi peptides may be γ-Glutamyl peptides. In some embodiments, γ-Glutamyl peptides are derived from the γ-glutamyl amino acid and are found naturally in various foods.

In some embodiments, kokumi peptides may be Lactoferrin-derived peptides. Lactoferrin is a protein found in milk and various other biological fluids. In some embodiments, peptides derived from lactoferrin have been found to possess kokumi properties, contributing to the richness and complexity of flavors.

In some embodiments, kokumi peptides may be a soybean-derived peptides. Peptides derived from soybeans, especially soy protein hydrolysates, have been shown to exhibit kokumi properties. These peptides can enhance the taste and mouthfeel of food products, providing a more satisfying and flavorful experience.

In some embodiments, kokumi peptides may be yeast extract peptides. In some embodiments, peptides derived from yeast extracts, such as autolyzed yeast or yeast extract, contain kokumi compounds that contribute to the overall taste perception. These peptides can enhance the savory and full-bodied qualities of food.

In some embodiments, sensory peptides are the taste of food that is affected by some molecules of some specific chemical nature derived from food proteins. In some embodiments, sensory peptides are the major natural compound originating from food sources that are responsible for taste but are in the area of scientific research due to the specific composition of amino acids which are well-known for their sensory properties.

Entrapping is a process of isolating specific cells or molecules from a mixture, especially by immobilization on a gel. In some embodiments, entrapping is the physical enclosure of enzymes in a small space and may refer to the capture of enzymes within a polymeric network or microcapsules of polymers that allows the substrate and products to passes through and retains the enzyme.

Flavor potentiators are substances when present in a food accentuates the taste of the food without contributing any flavor its own and may be accompanied by changes in the mouth feel or the product inducing a sensation of fullness or satisfaction. In some embodiments, flavor potentiators function by intensifying and improving the taste of other ingredients present in a product. Flavor potentiators are chemicals with little or no taste. In some embodiments, flavor potentiators include, but are not limited to, monosodium glutamate (MSG), guanylates (such as disodium guanylate) and inosinates (such as disodium inosinate), nucleotides, such as monosodium glutamate-5'-ribonucleotide (GMP) and disodium guanosine-5'-monophosphate (IMP), yeast extract, inulin and salt.

In some embodiments, suitable flavor potentiators include, but are not limited to, a range of 250 ppm to 1500 ppm of the total weight composition of the oleogel structure and the microgel structure. In another embodiment, suitable flavor potentiators include, but are not limited to, a range of 500 ppm to 1000 ppm of the total weight composition of the oleogel structure and the microgel structure.

Controlled release is a tailorable delivery of compounds (e.g., drugs, proteins, fertilizers, nutrients, and other biologically active agents) at an effective level in response to time and stimuli (e.g., pH, temperature, enzymes, UV light, magnetic fields, and osmosis.) In some embodiments, controlled release is the release of active compounds in a controlled manner to improve safety and quality for a wide range of food products. In one embodiment, controlled release is a reservoir device, in where the cargo molecule is in a closed physical space restricted by the matrix, which is rate-controlling the release and the molecule is confined to the center of the device. In another embodiment, controlled release is a matrix type device, in where the molecule cargo is uniformly distributed throughout the matrix and the kinetic of cargo release depends on the composition and physicochemical properties of the matrix and the cargo, their interactions, and geometry of the system. A suitable predetermined period of time associated with the controlled release of the microgel structure includes, but is not limited to, a range of 0.5 seconds to 3.5 seconds to release when exposed to sufficient temperature. In some embodiments, a suitable sufficient temperature associated with the controlled release of the microgel structures includes, but is not limited to, a range of 90 degrees Fahrenheit to 101 degrees Fahrenheit for a predetermined period of time. The controlled release of the microgel structure dynamically releases a range of 250 ppm to 1500 ppm of the total weight composition of the peptide-infused microgel structure over a range of 0.5 seconds to 3.5 seconds when exposed to a range of 95 degrees Fahrenheit to 105 degrees Fahrenheit. In one embodiment, suitable controlled releases of the microgel structure dynamically releases a range of 500 ppm to 1000 ppm of the total weight composition of the peptide-infused microgel structure over a range of 1.5 seconds to 2.5 seconds when exposed to a range of 98 degrees Fahrenheit to 101 degrees Fahrenheit.

At least some embodiments of the present disclosure provide technological solution(s) to a technological problem associated with a delivery of fat and flavor potentiators to an individual via foods. Typically, the fat and flavor potentiators are delivered to an individual through traditional digestion. Traditional digestion may refer to an item starting in the mouth of the individual, being broken down by force via teeth and a chemical conversion via heat and salvia.

The technical problem arises when a peptide is intended to deliver a substance that may be chemically converted via traditional digestion. Embodiments of the present disclosure detail a technological solution associated with the technological problem by entrapping a flavor potentiator within a microgel structure. In some embodiments, the flavor potentiator may refer to at least one protein flavor profile substance. In some embodiments, the microgel structure may refer to a result of a mixture of at least one hydrocolloid and a methylcellulose polymer-oil mixture capable of converting into a liquid phase at a predetermined temperature. In some embodiments, the entrapped flavor potentiator may be released via a controlled release when exposed to the predetermined temperature, allowing the flavor potentiator to be released at a known time and immune to chemical conversion via typical digestion.

FIG. 1 is a flowchart 100 illustrating operational steps for entrapping at least one flavor potentiator within a microgel structure to result in a peptide-infused microgel structure, in accordance with at least some embodiments of the present disclosure.

In step 102, an illustrative process 101 (not shown in FIG. 1) associated with a peptide-infused microgel structure 103 (not shown in FIG. 1) obtains a methylcellulose polymer. In some embodiments, the illustrative process 101 obtains the methylcellulose polymer from a plurality of polymers derived from an external source. In one embodiment, the illustrative process 101 obtains the methylcellulose polymer from the plurality of polymers, where the methylcellulose polymer is a derivate of cellulose with at least one hydroxyl group.

In step 104, the illustrative process 101 converts the at least one hydroxyl group associated with the methylcellulose polymer. In some embodiments, the illustrative process 101 converts the at least one hydroxyl group associated with the methylcellulose polymer into a plurality of methyl ether groups. In one embodiment, the illustrative process 101 converts the at least one hydroxyl group associated with the methylcellulose polymer into the plurality of methyl ether groups by heating and mixing the methylcellulose polymer. In some embodiments, the illustrative process 101 produces a converted methylcellulose polymer by converting the at least one hydroxyl group associated with the methylcellulose polymer into the plurality of methyl ether groups via the heating and mixing.

In step 106, the illustrative process 101 mixes at least one oil to the converted methylcellulose polymer. In some embodiments, the illustrative process 101 mixes the at least one oil to the converted methylcellulose polymer associated with the methylcellulose polymer to generate a methylcellulose polymer-oil mixture. In one embodiment, the illustrative process 101 mixes an aqueous solution that remains insoluble in water with the converted methylcellulose polymer associated with the methylcellulose polymer to generate the methylcellulose polymer-oil mixture. In some instances, the at least one oil has a melting point that at least meets a predetermined threshold of temperature. In some instances, the predetermined threshold of temperature is a range of a minimum of 90 degrees Fahrenheit and a maximum of 200 degrees Fahrenheit. In another embodiments, a suitable illustrative process 101 mixes a range of 5% to 49% of a plant-based oil to a range of 0.2% to 1% of a converted methylcellulose polymer to generate a methylcellulose polymer-oil mixture.

In step 108, the illustrative process 101 mixes at least one hydrocolloid to the methylcellulose polymer-oil mixture. In some embodiments, the illustrative process 101 mixes the at least one hydrocolloid to the methylcellulose polymer-oil mixture to generate a microgel structure. In one embodiment, the illustrative process 101 mixes the at least one hydrocolloid to the methylcellulose polymer-oil mixture and heat the methylcellulose polymer-oil mixture to generate the microgel structure. In some instances, the heat of the methylcellulose polymer-oil mixture to generate the microgel structure may refer to a sufficient temperature to result in a liquid phase. In some instances, the microgel structure includes, but is not limited to, an oleogel structure and at least one peptide. In some instances, the at least one peptide includes, but is not limited to, at least one of, but not limited to, an umami peptide, a kokumi peptide, and/or another sensory peptide. The illustrative process 101 mixes 0.1% to 1% of the at least one hydrocolloid to the methylcellulose polymer-oil mixture and heats the methylcellulose polymer-oil mixture to a range of 90 degrees Fahrenheit to 200 degrees Fahrenheit for a range of 2 minutes to 30 minutes. In one embodiment, a suitable illustrative process 101 mixes 0.075% to 0.125% of the at least one hydrocolloid to the methylcellulose polymer-oil mixture and heats the methylcellulose polymer-oil mixture to a range of 95 degrees Fahrenheit to 150 degrees Fahrenheit for a range of 5 minutes to 15 minutes.

In step 210, the illustrative process 101 entraps at least one flavor potentiator within the microgel structure. In some embodiments, the illustrative process 101 entraps the at least one flavor potentiator within the microgel structure to generate a peptide-infused microgel structure. In one embodiment, the peptide-infused microgel structure releases the entrapped flavor potentiator in a controlled release when exposed to sufficient heating. In another embodiment, the illustrative process 101 dynamically calculates a flavor compound retention score associated with the peptide-infused microgel structure based on the peptide-infused microgel structure ability to entrap the at least one flavor potentiator within the microgel structure. In some instances, the at least one flavor potentiator may refer to at least one protein flavor profile substance. In some embodiments and in response to entrapping the at least flavor potentiator within the microgel structure, the illustrative process 101 cools the peptide infused flavor potentiator to a sufficient temperature for a different predetermined period of time to fortify the at least one flavor potentiator entrapped within the microgel structure.

Figure 2:
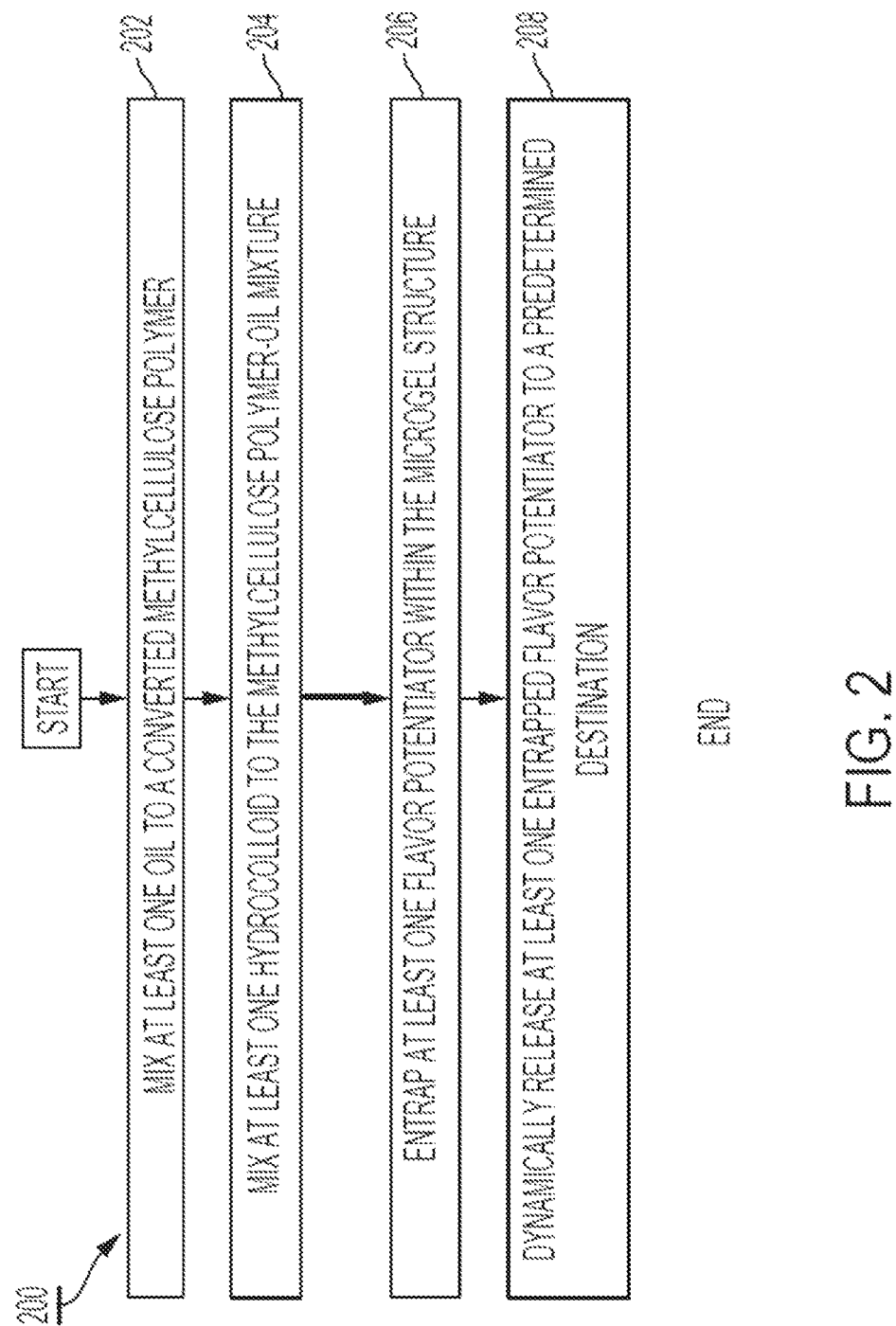
FIG. 2 is a flowchart illustrating operational steps for dynamically delivering fat and flavor potentiators via a peptide-infused microgel structure to at least one user, in accordance with at least some embodiments of the present disclosure.

FIG. 2 is a flowchart 200 illustrating operational steps for dynamically delivering fat and flavor potentiators via a peptide-infused microgel structure to at least one user, in accordance with at least some embodiments of the present disclosure.

In step 202, an illustrative process 101 (not shown in FIG. 2) associated with a peptide-infused microgel structure 103 (not shown in FIG. 2) mixes at least one oil to a converted methylcellulose polymer. In some embodiments, the illustrative process 101 mixes the at least oil to a converted methylcellulose polymer to generate a methylcellulose polymer-oil mixture. In one embodiment, the illustrative process 101 mixes the at least oil to a converted gelator polymer to result in a gelator polymer-oil mixture. In another embodiments, a suitable illustrative process 101 mixes a range of 5% to 49% of a plant-based oil to a range of 0.2% to 1% of a converted methylcellulose polymer to generate a methylcellulose polymer-oil mixture.

In step 204, the illustrative process 101 mixes at least one hydrocolloid to the methylcellulose polymer-oil mixture. In some embodiments, the illustrative process 101 mixes the at least one hydrocolloid to the methylcellulose polymer-oil mixture and heat the methylcellulose polymer-oil mixture to generate a microgel structure. In one embodiment, the illustrative process 101 mixes at least one viscosity modifier to the methylcellulose polymer-oil mixture and heat the methylcellulose polymer-oil mixture to generate the microgel structure. In another embodiment, the illustrative process 101 mixes the at least one viscosity modifier to a gelator polymer-oil mixture and heat the gelator polymer-oil mixture to a sufficient temperature. In some embodiments, the microgel structure is heated to a sufficient temperature to sustain the microgel structure in a liquid phase. In one embodiment, the microgel structure includes, but is not limited to, at least one oleogel structure and at least one peptide selected from a group of umami, kokumi, and another sensory peptide. In another embodiment, the microgel structure includes, but is not limited to, at least one oleogel structure and at least one flavor potentiator selected from a group of umami, kokumi, and another sensory flavor potentiator. The illustrative process 101 mixes 0.1% to 1% of the at least one hydrocolloid to the methylcellulose polymer-oil mixture and heats the methylcellulose polymer-oil mixture to a range of 90 degrees Fahrenheit to 200 degrees Fahrenheit for a range of 2 minutes to 30 minutes. In one embodiment, a suitable illustrative process 101 mixes 0.075% to 0.125% of the at least one hydrocolloid to the methylcellulose polymer-oil mixture and heats the methylcellulose polymer-oil mixture to a range of 95 degrees Fahrenheit to 150 degrees Fahrenheit for a range of 5 minutes to 15 minutes.

In step 206, the illustrative process 101 entraps at least one flavor potentiator within the microgel structure. In some embodiments, the illustrative process 101 entraps the at least one flavor potentiator within the microgel structure to result in a peptide-infused microgel structure. In one embodiment, the illustrative process 101 entraps a range of at least 250 ppm to 1000 ppm of the at least one flavor potentiator within the microgel structure. In another embodiment, the illustrative process 101 cools the microgel structure to a predetermined temperature for a predetermined period of time in response to entrapping the at least one flavor potentiator within the microgel structure. In some embodiments, the illustrative process 101 cools the microgel structure with an entrapped flavor potentiator to fortify the at least one flavor potentiator entrapped within the microgel structure.

In step 208, the illustrative process 101 dynamically releases at least one entrapped flavor potentiator to a predetermined destination. In some embodiments, the illustrative process 101 dynamically releases the at least one entrapped flavor potentiator within the peptide-infused microgel structure to a predetermined destination as a controlled release. In some instances, the controlled release is a predetermined external temperature sufficient to melt the peptide-infused microgel structure. In one embodiment, the illustrative process 101 dynamically releases at least one entrapped peptide to the predetermined destination as the controlled release. In some instances, the predetermined destination may refer to an orifice of a living thing. The controlled release of the microgel structure dynamically releases a range of 250 ppm to 1500 ppm of the total weight composition of the peptide-infused microgel structure over a range of 0.5 seconds to 3.5 seconds when exposed to a range of 95 degrees Fahrenheit to 105 degrees Fahrenheit. In one embodiment, suitable controlled releases of the microgel structure dynamically releases a range of 500 ppm to 1000 ppm of the total weight composition of the peptide-infused microgel structure over a range of 1.5 seconds to 2.5 seconds when exposed to a range of 98 degrees Fahrenheit to 101 degrees Fahrenheit.

Figure 3:
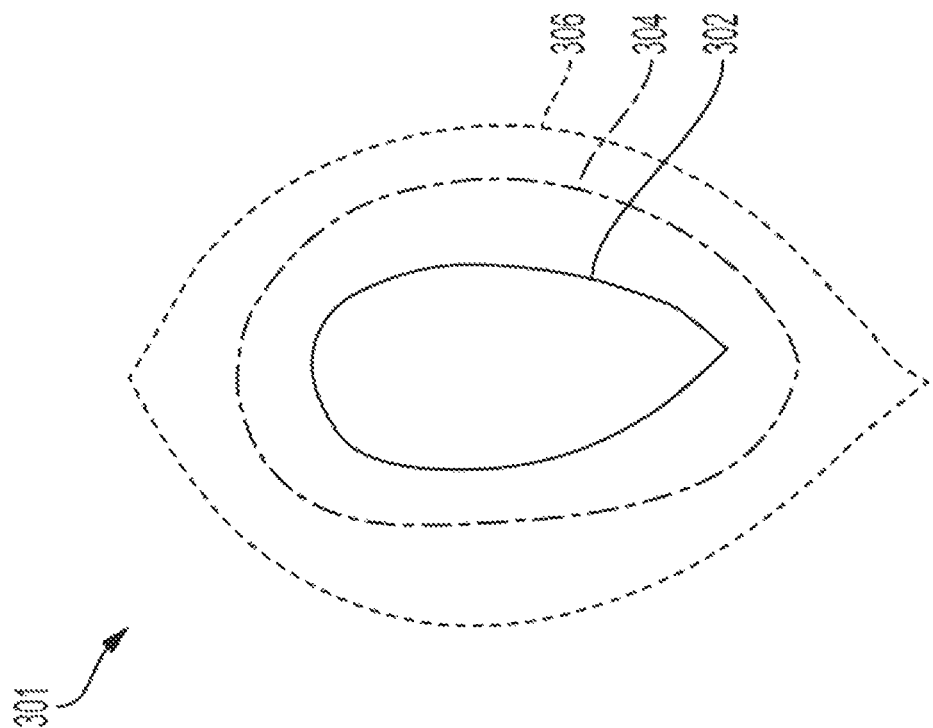
FIG. 3 depicts an exemplary cross-sectional view of a peptide-infused microgel structure, in accordance with at least some embodiments of the present disclosure.

FIG. 3 depicts an exemplary cross-sectional view 300 of a peptide-infused microgel structure, in accordance with at least some embodiments of the present disclosure. In FIG. 3, the peptide-infused microgel structure 301 includes at least one oleogel layer 302 that encompasses at least one peptide 304, where the at least oleogel layer 302 and the at least one peptide 304 generate a microgel structure 301. In some embodiments, the microgel structure 301 entraps at least one flavor potentiator 306 within the microgel structure 301. In one embodiment, a suitable oleogel layer 302 includes, but is not limited to, a range of 51% to 90% of a plant-based oil, a range of 0.1% to 1% of a gelator, a range of 0.2% to 1% of a at least one viscosity modifier, a range of 250 ppm to 1500 ppm of the flavor potentiator, and a range of 10% to 49% of deionized water. In another embodiment, suitable oleogel layer 302 includes, but is not limited to, a range of 55% to 65% of the plant-based oil, a range of 0.4% to 0.6% of the gelator, a range of 0.4% to 0.8% of the viscosity modifier, a range of 500 ppm to 1000 ppm of the flavor potentiator, and a range of 25% to 35% of deionized water.

In one embodiment, suitable microgel structure 301 includes, but is not limited to, a range of 5% to 49% of a plant-based oil, a range of 0.05% to 0.5% of a gelator, a range of 0.1% to 1% of a at least one viscosity modifier, a range of 250 ppm to 1500 ppm of the flavor potentiator, and a range of 51% to 95% of deionized water. In another embodiment, suitable microgel structure 301 includes, but is not limited to, a range of 10% to 30% of the plant-based oil, a range of 0.075% to 0.125% of the gelator, a range of 0.4% to 0.8% of the viscosity modifier, a range of 500 ppm to 1000 ppm of the flavor potentiator, and a range of 60% to 90% of deionized water.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   mixing at least one oil to a converted gelator polymer to result in a gelator polymer-oil mixture,
   mixing at least one hydrocolloid to the gelator polymer-oil mixture and heating the gelator polymer-oil mixture to result in a microgel structure,
   wherein the heating of the microgel structure to a sufficient temperature to result in a liquid phase,
   wherein the microgel structure comprises the following properties:
   a) at least one oleogel,
   wherein the at least one oleogel has a continuous oil phase; and
   b) at least one peptide selected from a group consisting of a umami peptide, and a kokumi peptide,
   wherein the umami peptide comprises at least one of glutathione, a hydrolyzed protein, a fermented protein, or a seaweed extract,
   wherein the kokumi peptide comprises at least one of a γ-glutamyl peptide, a lactoferrin-derived peptide, a soybean-derived peptide, or a yeast extract peptide; and
   entrapping at least one flavor potentiator within the microgel structure to result in a peptide-infused microgel structure,
   wherein the at least one flavor potentiator is entrapped within the peptide-infused microgel structure so as to result in, when heated to a temperature of 95° F. to 105° F., the peptide-infused microgel structure releases the entrapped flavor potentiator in a controlled release,
   wherein the peptide-infused microgel structure is 51% to 95% water based on a total weight of the peptide-infused microgel structure,
   wherein the at least one oleogel, the at least one peptide, and the at least one flavor potentiator are dispersed in the water.

2. The method of claim 1, wherein the converted gelator polymer is a result of a derivative of cellulose with at least one hydroxyl group.

3. The method of claim 1, wherein the converted gelator polymer is a result of heating and mixing at least one cellulose polymer to convert at least one hydroxyl group associated with the at least one cellulose polymer into a plurality of methyl ether groups.

4. The method of claim 1, wherein the at least one oil has a melting point that exceeds a predetermined threshold of temperature.

5. The method of claim 4, wherein the predetermined threshold of temperature is a minimum of 90 degrees Fahrenheit.

6. The method of claim 4, wherein the predetermined threshold of temperature is a maximum of 200 degrees Fahrenheit.

7. The method of claim 1, further comprising dynamically calculating a flavor compound retention score associated with the peptide-infused microgel structure.

8. The method of claim 1, wherein the at least one flavor potentiator is at least one protein flavor profile substance.

9. The method of claim 1, further comprising encapsulating the umami peptide within the microgel structure to result in the peptide-infused microgel structure.

10. The method of claim 1, further comprising encapsulating the kokumi peptide within the microgel structure to result in the peptide-infused microgel structure.

11. The method of claim 1, further comprising cooling the peptide-infused microgel structure to a sufficient temperature for a different predetermined period of time to fortify the at least one flavor potentiator entrapped within the peptide-infused microgel structure.

12. A method comprising:
    obtaining a methylcellulose polymer,
    wherein the methylcellulose polymer is a derivative of cellulose with at least one hydroxyl group associated with at least one methylcellulose polymer;
    heating and mixing to convert the at least one hydroxyl group associated with the methylcellulose polymer into a plurality of methyl ether groups;
    mixing at least one oil to the converted methylcellulose polymer to result in a methylcellulose polymer-oil mixture,
    wherein the at least one oil has a melting point that at least meets a predetermined threshold of temperature;
    mixing at least one hydrocolloid to the methylcellulose polymer-oil mixture and heating the methylcellulose polymer-oil mixture to result in a microgel structure,
    wherein the heating of the microgel structure to a sufficient temperature to result in a liquid phase,
    wherein the microgel structure comprises the following properties:
    a) an oleogel structure,
    wherein the oleogel structure has a continuous oil phase, and
    b) at least one peptide selected from a group consisting of a umami peptide, and a kokumi peptide,
    wherein the umami peptide comprises at least one of glutathione, a hydrolyzed protein, a fermented protein, or a seaweed extract,
    wherein the kokumi peptide comprises at least one of a γ-glutamyl peptide, a lactoferrin-derived peptide, a soybean-derived peptide, or a yeast extract peptide; and
    entrapping at least one flavor potentiator within the microgel structure to result in a peptide-infused microgel structure,
    wherein the at least one flavor potentiator is entrapped within the peptide-infused microgel structure so as to result in, when heated to a temperature of 95° F. to 105° F., the peptide-infused microgel structure releases the entrapped flavor potentiator in a controlled release,
wherein the peptide-infused microgel structure is 51% to 95% water based on a total weight of the peptide-infused microgel structure,
wherein the oleogel structure, the at least one peptide, and the at least one flavor potentiator are dispersed in the water.

13. The method of claim 12, wherein the predetermined threshold of temperature is a minimum of 90 degrees Fahrenheit.

14. The method of claim 12, wherein the predetermined threshold of temperature is a maximum of 200 degrees Fahrenheit.

15. The method of claim 12, further comprising dynamically calculating a flavor compound retention score associated with the peptide-infused microgel structure.

16. The method of claim 12, further comprising encapsulating the umami peptide within the microgel structure to result in the peptide-infused microgel structure.

17. A composition comprising:
a peptide-infused microgel structure;
wherein the peptide-infused microgel structure comprises:
a) at least one oleogel,
wherein the at least one oleogel has a continuous oil phase,
b) at least one peptide selected from a group consisting of an umami peptide and a kokumi peptide;
wherein the umami peptide comprises at least one of glutathione, a hydrolyzed protein, a fermented protein, or a seaweed extract;
wherein the kokumi peptide comprises at least one of a γ-glutamyl peptide, a lactoferrin-derived peptide, a soybean-derived peptide, or a yeast extract peptide, and
c) at least one flavor potentiator,
wherein the at least one flavor potentiator is entrapped within the peptide-infused microgel structure so as to result in, when heated to a temperature of 95° F. to 105° F., the peptide-infused microgel structure releases the entrapped flavor potentiator in a controlled release,
wherein the peptide-infused microgel structure is 51% to 95% water based on a total weight of the peptide-infused microgel structure,
wherein the at least one oleogel, the at least one peptide, and the at least one flavor potentiator are dispersed in the water.

18. The composition of claim 17, further comprising the umami peptide encapsulated within the peptide-infused microgel structure to result in the peptide-infused microgel structure.

* * * * *